United States Patent
Swaney et al.

(10) Patent No.: US 6,311,311 B1
(45) Date of Patent: Oct. 30, 2001

(54) MULTIPLE INPUT SHIFT REGISTER (MISR) SIGNATURES USED ON ARCHITECTED REGISTERS TO DETECT INTERIM FUNCTIONAL ERRORS ON INSTRUCTION STREAM TEST

(75) Inventors: Scott B. Swaney, Castskill; William V. Huott, Holmes; Bruce Wile, Poughkeepsie, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/377,125

(22) Filed: Aug. 19, 1999

(51) Int. Cl.[7] .................................................. G06F 17/50
(52) U.S. Cl. ................... 716/4; 712/10; 712/11; 714/30; 714/724; 714/732
(58) Field of Search ............................ 714/732, 30, 724; 712/10, 11, 215; 716/4

(56) References Cited

U.S. PATENT DOCUMENTS

| | | |
|---|---|---|
| Re. 31,828 | 2/1985 | Raymond et al. ............. 371/20 |
| 4,216,539 | 8/1980 | Raymond et al. ............. 371/20 |
| 5,347,652 | 9/1994 | Epstein et al. ............. 707/22.5 |
| 5,590,345 * | 12/1996 | Barker et al. ............. 712/11 |
| 5,638,382 | 6/1997 | Krick et al. ............. 371/22.4 |
| 5,734,921 * | 3/1998 | Dapp et al. ............. 712/10 |
| 5,784,383 | 7/1998 | Meaney ............. 371/22.4 |
| 5,978,946 * | 11/1999 | Needham ............. 712/732 |
| 6,055,660 * | 4/2000 | Meaney ............. 714/732 |
| 6,065,106 * | 5/2000 | Deao et al. ............. 714/30 |

OTHER PUBLICATIONS

Roche, P., Logic Signature Application, IBM Tecchnical Disclosure Bulletin, Vol. 27, No.8, Jan., 1985, pp. 4943–4944.

* cited by examiner

*Primary Examiner*—Matthew Smith
*Assistant Examiner*—Jibreel Speight
(74) *Attorney, Agent, or Firm*—Lynn L. Augspurger

(57) ABSTRACT

A method for verifying all intermediate results of a set of architected registers at the end of an instruction stream, even if the final values do not depend on the values of all intermediate results, using a single MISR (Multiple Input Shift Register) to generate a signature of all updates to multiple architected registers. Single instructions update multiple registers across multiple machine cycles, and an accumulation register allows order independence of partial results. A register update consists of the data to be written, an address identifying which register is to be updated, and controls to identify if this is the last register update that will be done by the current instruction. For each cycle, logic evaluates the update controls to select what will be gated into the accumulation register and also sets MISR control latches to tell how to update the MISR the next cycle. The latched MISR controls select whether the MISR will clear, hold, or evaluate. The expected final MISR value (signature) is compared to the actual final MISR value (signature). A mismatch indicates a functional error during execution of the instruction stream.

3 Claims, 1 Drawing Sheet

MULTIPLE INPUT SHIFT REGISTER (MISR) SIGNATURES USED ON ARCHITECTED REGISTERS TO DETECT INTERIM FUNCTIONAL ERRORS ON INSTRUCTION STREAM TEST

FIELD OF THE INVENTION

This invention pertains to the field of computer systems. Particularly, verification of the implementation of a processor architecture via comparison of actual and expected results of architected registers after the execution of instruction streams, particularly where there are many instructions in the stream, creating long instruction streams.

Trademarks: S/390 and IBM are registered trademarks of International Business Machines Corporation, Armonk, N.Y., U.S.A. Other names may be registered trademarks or product names of International Business Machines Corporation or other companies.

BACKGROUND

Within IBM, the mainframe designs have chips with logic testing registers called Multiple Input Shift Register (MISR) which were provided for various manufacturing tests to test for quality assurance of the hardware. Another use of multiple input shift registers is for error checking in processors where data is partitioned across one or more chips. U.S. Pat. No. 5,784,383 illustrates a method, unrelated to the present solution used for functions testing, which uses a Multiple Input Shift Register (MISR) which permits detecting of errors across chip boundaries due to a hardware failure in control logic even though a processor's error checking code (ECC) is not bad. A Multiple Input Shift Register (MISR) on each bus is used to collect a dynamic signature representing all the critical buses on each chip that need to be compared. The MISR state combines present and previous states of these buses, so for the testing in accordance with the method of U.S. Pat. No. 5,784,383 the MISR will be different if one or more bus controls break or are broken. Since an N-bit MISR shifts, comparing a single bit of the MISR each cycle guarantees detection within N cycles of a problem. The method of U.S. Pat. No. 5,784,383 for identifying errors includes accumulating bus signature information which is a function of current and previous values of an input bus structures to determine sync of buses.

Functional testing for verification of functional design of processors is partly done by comparing the actual to expected values of architected registers after simulation of test instruction streams consisting of a few to many instructions. Until the present, this type of functional verification has been incomplete for cases where an instruction in a test instruction stream updates a register incorrectly due to a functional design problem, but the problem is not detected because the incorrect register value is overwritten by a subsequent instruction in the test instruction stream before being used as a source operand. The comparison of actual to expected results at the completion of the simulation of the entire test instruction stream does not detect this functional error since the incorrect interim register value is not observed and does not affect the final register value. There is a desire to improve the functional verification of processors by having all interim register values of test instruction streams checked, although still only comparing actual to expected values at the completion of the simulation of the test instruction stream.

SUMMARY OF THE INVENTION

In accordance with our preferred embodiment, we have provided a method for improving functional testing for verification of functional design of processors by using a Multiple Input Shift Register (MISR) to make all updates to all architected registers during the execution of a test instruction stream observable. This method overcomes the problem that some interim values which appeared during functional instruction stream testing would be overwritten by subsequent instructions in a test instruction stream without being used as source operands, so that the final values did not depend on these interim values and are thus not checked.

These and other improvements are set forth in the following detailed description. For a better understanding of the invention with advantages and features, refer to the description and to the drawing.

Figure 1:
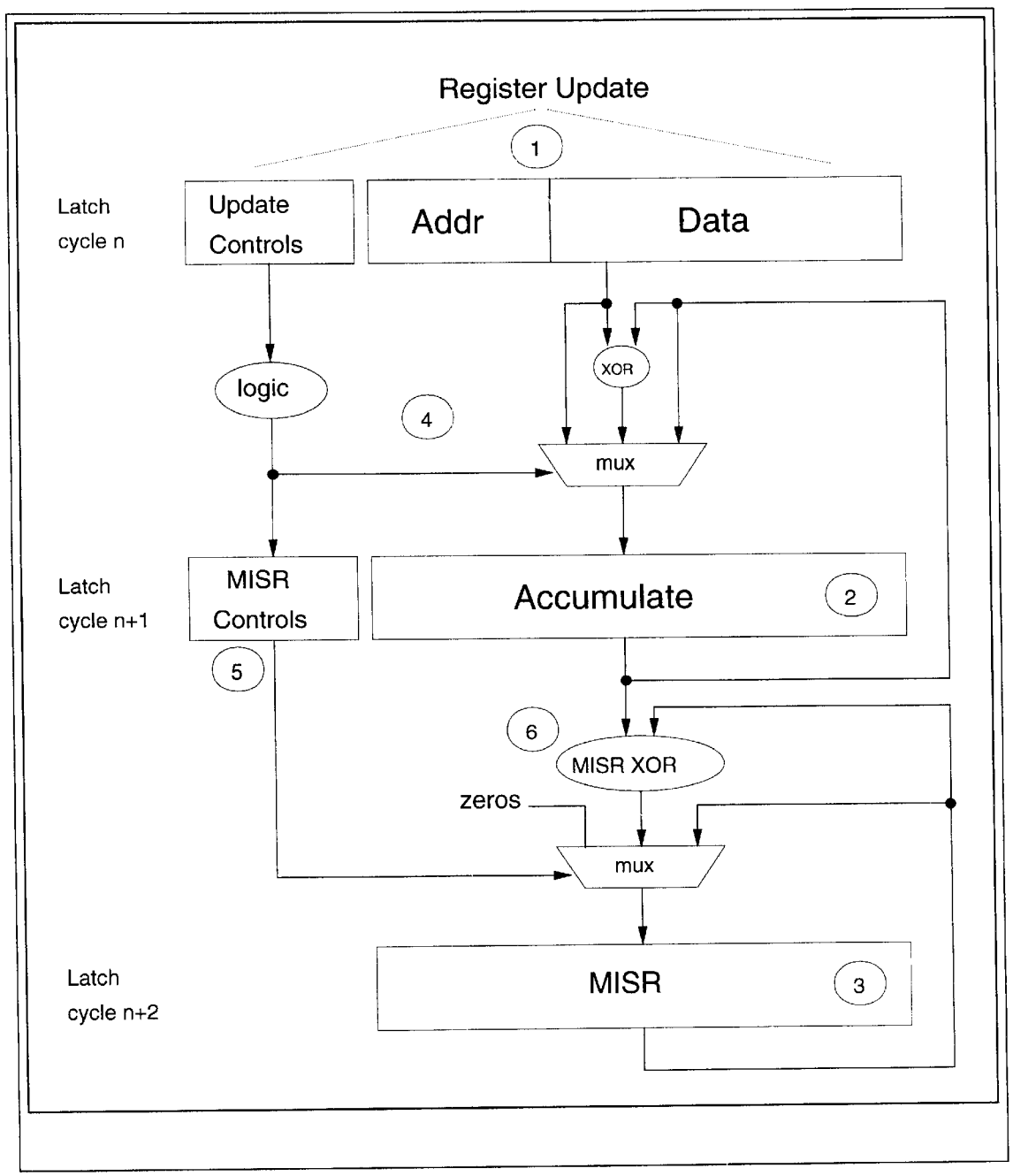
FIG. 1 illustrates how a MISR can be used to verify all interim results of a set of architected registers at the end of the execution of a test instruction stream.

Our detailed description explains the preferred embodiments of our invention, together with advantages and features, by way of example with reference to the drawing.

DETAILED DESCRIPTION OF THE INVENTION

In accordance with our preferred embodiment, our process improves upon functional verification of a processor through testing the values of architected registers, such as general purpose registers (GPR), floating point registers (FPR), and other architected registers of an IBM S/390 processor by comparing their actual values to expected values after the execution of a test instruction stream. This comparison alone does not verify interim register results which are overwritten by subsequent instructions in the test stream without being used as source operands, since the final architected register values do not depend on these interim values. Our method includes the use of a Multiple Input Shift Register (MISR) to generate a signature of all updates to all architected registers throughout the execution of a test instruction stream, so that even interim values which are not depended on for the final architected register values will still be tested by comparing the actual to expected final MISR value.

As a result of the method used in our preferred embodiment illustrated in FIG. 1, we are now able to detect functional problems that only affect interim results by using a Multiple Input Shift Register (MISR) to generate a signature of all interim results which can then be checked after the execution of the test stream to verify all final and interim values. This verifies the correct operation of every instruction in the test stream without checking until the end of the stream. This provides better coverage and result checking in simulation as well as in hardware bring-up environments.

As a result of providing and using the Multiple Input Shift Register (MISR) to generate a signature of all interim results which occurring during a test instruction stream, an interim value which is incorrectly updated due to a functional design error but overwritten without first being used as a source operand will now result in a MISR miscompare at the end of the execution of the test instruction stream even though the values of the architected registers will be correct. This improves the functional test coverage as without the MISR signature the functional problem that resulted in an incorrect interim result would not have been detected.

FIG. 1 illustrates how a MISR can be used to verify intermediate results of a set of architected registers at the end of an instruction stream. In the process of the present invention, the execution of the functional instruction test stream will generate a signature of register updates. In addition, the process uses a single Multiple Input Shift Register (MISR) to generate a signature of all interim results to cover multiple architected registers in accordance with our preferred embodiment. This solution is less expensive than an alternative embodiment (not shown and not preferred) which would provide a separate MISR for every architected register which would require more chip real estate.

Out preferred process also handles the repertory of instructions in the IBM S/390 architecture which updates multiple architected registers across multiple cycles with a single instruction, such as LOAD MULTIPLE, LOAD ACCESS MULTIPLE, COMPARE DOUBLE AND SWAP, SHIFT LEFT DOUBLE, SHIFT RIGHT DOUBLE, etc.

In accordance with our preferred embodiment, we provide for the use of an accumulation register in combination with our Multiple Input Shift Register (MISR) for functional testing. As a result, we allow for order independent accumulation of multiple partial results obtained during execution of a single instruction in the test stream. The process needs predictable results, and predicting results with order independence of partial results is made much simpler by providing an accumulation register. Thus, now referring particularly to FIG. 1, it will be seen that in our preferred embodiment we capture register updates (1) produced during the execution of an instruction in a test instruction stream in a latch (illustrated latch cycle n). Each register update consists of the data to be written into the architected register, an address identifying which architected register is to be updated, and controls to identify if this is the last register update that will be done by the current instruction since the current instruction may update one or more registers. In the processing of the register update, logic (4) (illustrated as grouped logic applicable to a register update including XOR, MUX and logic to analyze the update controls) evaluates the update controls to determine what address and data will be gated into the accumulation register (2) and sets MISR control latches (5) (illustrated cycle n+1) provided to control updates to the Multiple Input Shift Register (MISR) (3) during the next cycle. During the next cycle, the latched MISR controls (5) select whether the Multiple Input Shift Register (MISR) (3) will clear, hold, or evaluate as determined by the MISR register logic (6). At the end of the execution test instruction stream, the MISR (3) will contain a unique signature of all the register updates produced by the execution of the instructions in the test instruction stream which can be compared against an expected value.

The logic (4) which evaluates the update controls from latch n+1 works as follows: If there is no register update on the current cycle, then the accumulation register will hold its value for the next cycle. If there is a register update and it is the first update for the current instruction, the data and address for the update are gated directly into the accumulation register. If there is a register update and it is not the first update for the current instruction, then the output of the accumulation register is bitwise exclusive OR'ed with the data and address for the register update into the input of the accumulation register, thus "accumulating" the current cycle's register update with the previous value in the accumulation register. This bitwise XOR accumulation is order independent. If an update is the last register update for the current instruction, then the MISR controls (5) are set to indicate that the MISR (3) should be evaluated. Otherwise, the MISR controls are set to hold the MISR for the next cycle.

During each cycle, the MISR controls (5) select whether the MISR should be cleared, held, or evaluated. The MISR is evaluated whenever the last register update for an instruction was done the previous cycle. The evaluation of the MISR (6) is done by exclusive ORing each bit(n) of the accumulation register output with the previous bit(n−1) of the MISR output, except for bit(0) which gets a multi-way exclusive OR of bit(0) of the accumulation register with various bits of the MISR output depending on the total number of bits in the MISR. It should be noted that our process involves the use of a MISR, not the MISR function itself.

When the MISR is not being evaluated, it is generally held. A mechanism to clear the MISR is not necessarily required. In a simulation environment, simulators can generally override logic to force values. However, to be useful in a real hardware implementation, a mechanism to clear the MISR would be required to synchronize the actual and expected values between test cases.

The desired clearing mechanism depends on the architecture of the processor that is using this function. One example, which can be implemented with the logic described provides as a clearing mechanism, is the assigning of a register address to the MISR (3), during the instruction stream the update control logic (4) sets the MISR controls (5) to clear the MISR when it sees an update to that register address instead of treating it as a normal register update.

Note that accumulation of partial results via a bitwise exclusive OR is order independent. This provides the ability to predict rules as in order for the MISR to be useful an expected value must be calculated or simulated. There may be times when the order of multiple register updates within an instruction is not known or not consistent. An order-independent accumulation scheme is important for being able to predict an expected MISR value for some designs. Our preferred embodiment uses the accumulation register to provide this expected value order independency. If the order of partial result updates is always known, then the accumulation register is not needed at all, and register updates can be directly evaluated into the MISR. However, in our preferred embodiment, the order of partial results is not always known, so we have provided the accumulation register in our process to allow for calculation or simulation of partial results with order independence.

Also note that the register address is accumulated and included in the MISR along with the data. This allows a single MISR to be used for multiple registers. However, note that the order-independent accumulation scheme identified here will not identify errors where a single instruction incorrectly "swapped" two registers. This is a small subset of the failure set targeted here. Should these failure prove onerous, they can be remedied by a more sophisticated accumulation scheme.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for improving the effectiveness of verification of the functional design of a processor containing multiple architected registers, one or more of which architected registers may have their values updated as a result of the execution of an instruction, comprising the steps of:

providing a test instruction stream of a plurality of instructions to a processor for testing said processor for its functional design, causing said processor to complete the execution of instructions in said test instruction stream causing any of the architected registers of said processor to have its value updated by more than one instruction in said test instruction stream whereby the final value of one architected register whose value is updated by said test instruction stream execution does not necessarily depend upon interim values of the one architected register which occur during execution of said test instruction stream because the interim values are overwritten by a subsequent instruction in said test instruction stream without the final values being used as source operands, and verifying the functional design by determining the actual value of said one of said architected registers by comparing the actual value of one of said architected registers to expected value of said one architected registers after the completion of the execution of a test instruction stream while using at least one Multiple Input Shift Register to generate a unique signature of all architected register updates, including all interim values.

2. A method for improving the effectiveness of verification of the functional design of a processor containing multiple architected registers according to claim 1 wherein is provided for said processor at least one accumulation register and at least one Multiple Input Shift Register (MISR), and combinatorial and latched control logic including MISR control latches for updating and evaluating said accumulation registers and MISRs, and said method includes capturing each architected register update of said one architected register during execution of each instruction in said test instruction stream, where said architected register update consists of the data value for the architected register, an address to identify which architected register is to be updated, and update controls to identify if this is the last register update that will be done by the currently executing instruction.

3. A method for improving the effectiveness of verification of the functional design of a processor containing multiple architected registers according to claim 2 wherein said method includes selecting during a first processor cycle what data and address will be gated into an accumulation register, and also during said processor cycle setting said MISR control latches to determine how to update one Multiple Input Shift Register (MISR) during a second cycle, the setting of said MISR control latches setting determining whether the one Multiple Input Shift Register (MISR) will clear, hold, or evaluate, and during a subsequent processor cycle, evaluating the contents of said one Multiple Input Shift Register (MISR) when the setting of said MISR control latches are set to evaluate, and comparing the actual MISR value after execution of the test instruction stream to the expected MISR value, an error indicating a functional error during the execution of the test instruction stream, where the final MISR values after completion of the execution of the test instruction stream depends on all said interim architected register values thereby making all said interim values observable and testable.

* * * * *